US006988872B2

(12) United States Patent
Soechting et al.

(10) Patent No.: US 6,988,872 B2
(45) Date of Patent: Jan. 24, 2006

(54) TURBINE MOVING BLADE AND GAS TURBINE (75) Inventors: Friedrich Soechting, Miami, FL (US);
Charles Ellis, Miami, FL (US);
Yasuoki Tomita, Takasago (JP);
Shunsuke Torii, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 19 days.

(21) Appl. No.: 10/351,479

(22) Filed: Jan. 27, 2003

(65) Prior Publication Data

US 2004/0146402 A1   Jul. 29, 2004

(51) Int. Cl.
B63H 1/14        (2006.01)

(52) U.S. Cl. ............... 416/96 R; 416/97 R; 415/115; 415/116

(58) Field of Classification Search ............ 416/96 R, 416/96 A, 97 R, 97 A; 415/115, 116
See application file for complete search history.

(56) References Cited

U.S. PATENT DOCUMENTS

| | | | | |
|---|---|---|---|---|
| 5,183,385 A | * | 2/1993 | Lee et al. | 416/97 R |
| 5,192,192 A | * | 3/1993 | Ourhaan | 416/97 R |
| 5,326,224 A | * | 7/1994 | Lee et al. | 416/97 R |
| 5,337,805 A | | 8/1994 | Green et al. | |
| 5,403,158 A | | 4/1995 | Auxier | |
| 5,403,159 A | | 4/1995 | Green et al. | |
| 5,873,695 A | * | 2/1999 | Takeishi et al. | 415/115 |
| 5,975,851 A | | 11/1999 | Liang | |
| 6,019,579 A | | 2/2000 | Fukuno et al. | |
| 6,036,436 A | * | 3/2000 | Fukuno et al. | 415/115 |
| 6,224,336 B1 | * | 5/2001 | Kercher | 416/97 R |
| 6,264,426 B1 | * | 7/2001 | Fukuno et al. | 415/115 |
| 6,481,967 B2 | | 11/2002 | Tomita et al. | |
| 6,602,052 B2 | * | 8/2003 | Liang | 416/97 R |

FOREIGN PATENT DOCUMENTS

| | | |
|---|---|---|
| DE | 693 17 901 | 10/1998 |
| JP | 10-85977 | 4/1998 |
| JP | 10-252404 | 9/1998 |
| WO | WO 94/12390 | 6/1994 |

* cited by examiner

Primary Examiner—Hoang Nguyen
(74) Attorney, Agent, or Firm—Oblon, Spivak, McClelland, Maier & Neustadt, P.C.

(57) ABSTRACT

The object of the present invention is to provide a turbine moving blade that has high heat resistance and can be used for a long period of time by improving the cooling efficiency of the turbine moving blade, and to improve both the thermal efficiency and operating efficiency of a gas turbine through the use of this turbine moving blade. In order to achieve the object, the present invention provide a turbine moving blade arranged in a combustion gas flow path in which a plurality of blow-out openings for blowing out a cooling medium are formed in its outer surface, wherein among a plurality of cooling medium trailing edge blow-out openings arranged from the vicinity of a blade base to the vicinity of a blade tip along a blade trailing edge of turbine moving blade, the opening area of a blade tip trailing edge blow-out opening located in the vicinity of blade tip is set to be larger than the opening area of the other trailing edge blow-out openings.

8 Claims, 7 Drawing Sheets

FIG. 8

TURBINE MOVING BLADE AND GAS TURBINE

BACKGROUND OF THE INVENTION

1. Field of the Invention

The present invention relates to a turbine moving blade of a gas turbine suitably used in a power generation plant and so forth as well as a gas turbine comprising the moving blade, and more particularly, to a turbine moving blade provided with a cooling structure.

2. Description of the Related Art

It is effective to increase the temperature of the combustion gas (fluid) for operation at the turbine inlet in order to improve the thermal efficiency of industrial gas turbines used in power generation plants and so forth. On the other hand, since the heat resistance performance of the turbine moving blades, stationary blades and other members exposed to combustion gas is restricted by the physical properties of their materials, it is not possible to simply raise the turbine inlet temperature.

Therefore, thermal efficiency is increased by ensuring the heat resistance performance of the turbine blades by increasing the temperature of the turbine inlet while cooling the turbine blades with a cooling medium such as cooling air.

Examples of such turbine blade cooling methods include a convection cooling in which a cooling medium is made to flow within the turbine blades, and an impingement cooling. In addition, a film cooling is also used in which the cooling medium is blown onto the outer surface of the turbine blades to form a cooling medium film.

Figure 7:
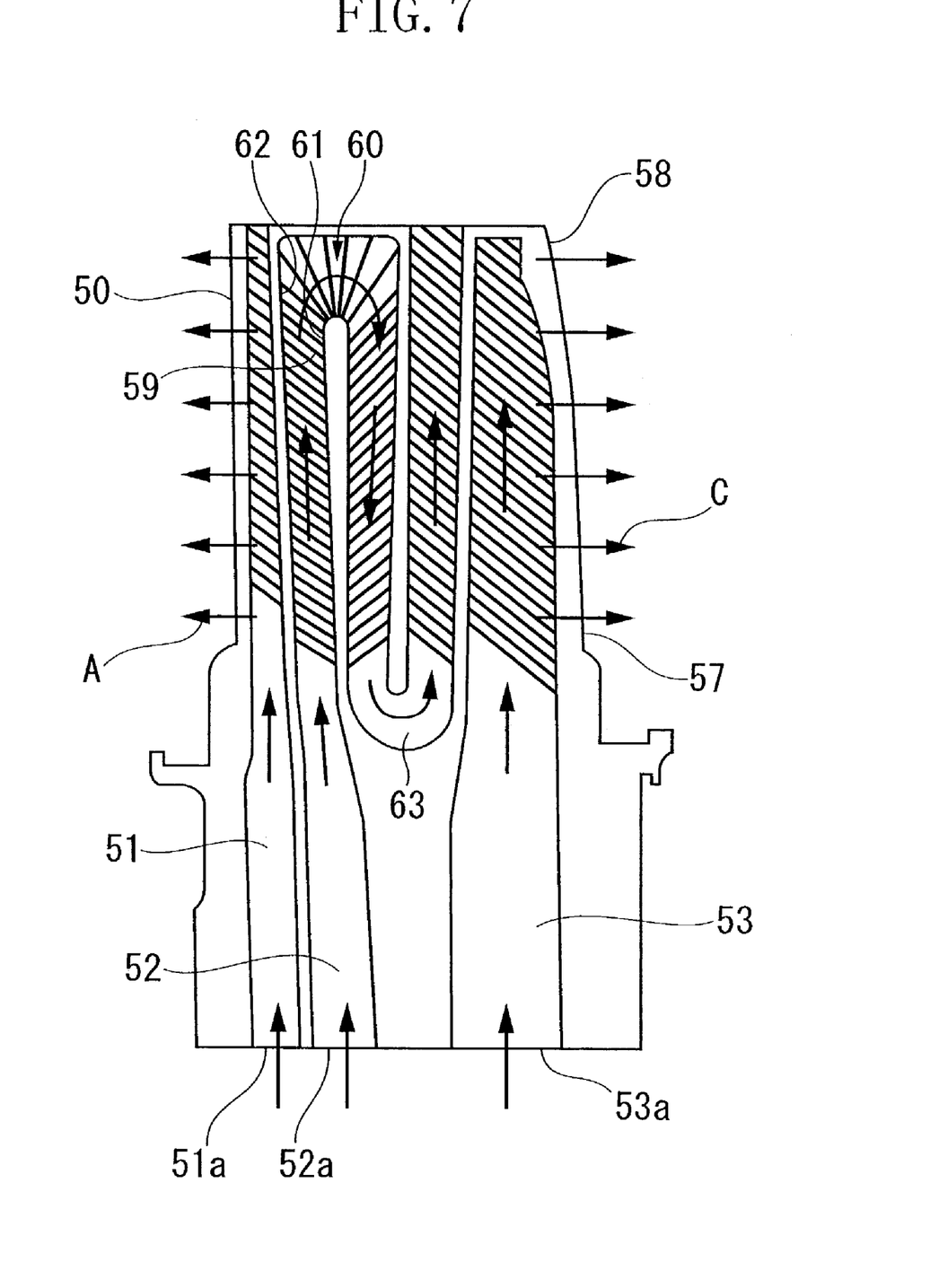
FIG. 7 is an internal cross-sectional view of a turbine moving blade of the prior art.
Figure 8:
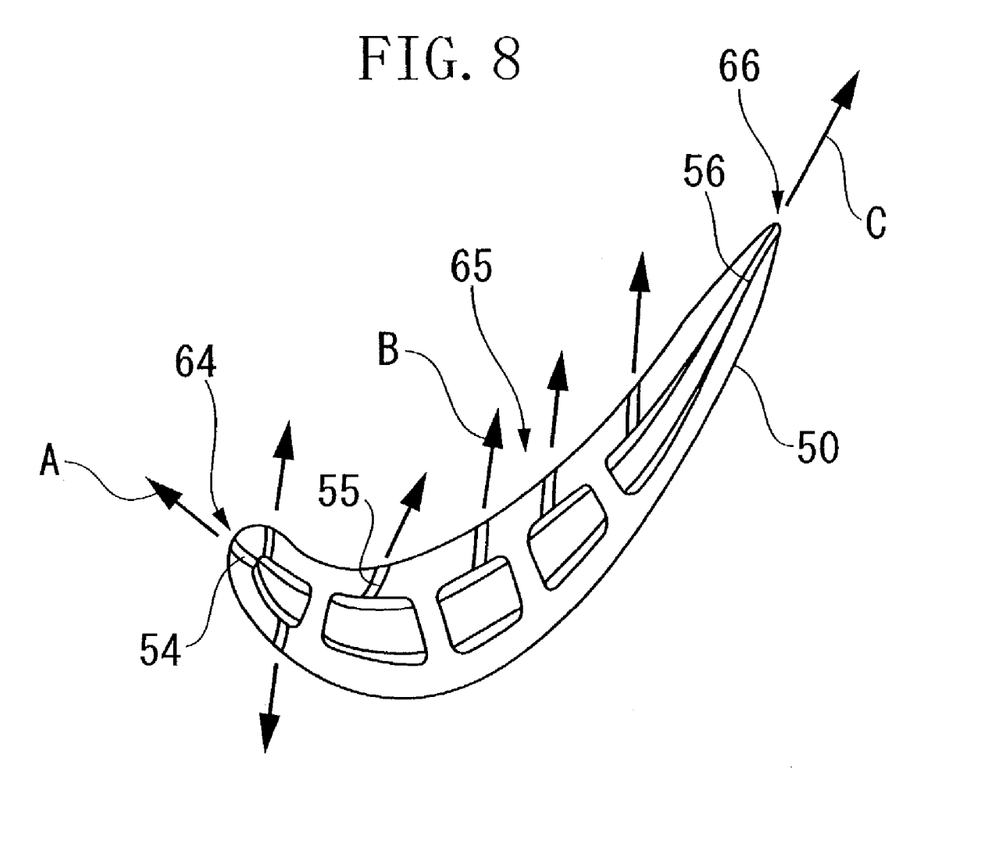
FIG. 8 is a cross-sectional view of the turbine moving blade of the prior art.

The following provides an explanation of the structure of a turbine moving blade of the prior art using FIGS. 7 and 8.

As shown in the internal cross-sectional view of FIG. 7, a turbine moving blade 50 has three internal flow paths 51, 52 and 53 through which a cooling medium flows, supply openings 51a, 52a and 53a through which a cooling medium is supplied are provided in the base end surfaces, and a plurality of blow-out openings are formed in the outer surface for blowing out a cooling medium. As shown in the cross-sectional view of FIG. 8, the blow-out openings comprise leading edge blow-out openings 54 provided in leading edge 64 of the turbine moving blade 50, blade surface blow-out openings 55 provided in the blade surface, and trailing edge blow-out openings 56 provided in the trailing edge 66. The trailing edge blow-out openings 56 are provided at a plurality of locations from the vicinity of the blade base 57 to the vicinity of the blade tip 58 along the trailing edge 66, and each the trailing edge blow-out opening 56 is formed to the same dimensions. Numerous blade surface blow-out openings 55 are provided in the high-pressure side blade surface 65, and are inclined either towards the direction of the leading edge or the direction of the trailing edge. Showerhead cooling is performed by blow-out A from the leading edge blow-out openings 54, total surface film cooling is performed by blow-out B from the blade surface blow-out openings 55, and slot cooling is performed by blow-out C from the trailing edge blow-out openings 56.

In addition, a plurality of turbulators 59 are provided so as to be inclined relative to the flow of the cooling medium for improving cooling efficiency by agitating the flow of the cooling medium. In the case of the internal flow path 52 having two U-turn sections, the turbulators 59 are provided as follows. That is, on the upstream side of the U-turn section 60, the turbulators are provided so as to be inclined upstream to downstream when facing from a wall that is continuous with the inside wall 61 of the U-turn section 60 towards a wall that is continuous with the outside wall 62 of the U-turn section 60. On the downstream side of the U-turn section 60, the turbulators 59 are inclined so as to have the opposite orientation. Since the orientation of the turn of the next U-turn section 63 is opposite of that of the turn of U-turn section 60, the inclination of turbulators 59 on the downstream side of the U-turn section 60 becomes the inclination of the turbulators 59 on the upstream side of the U-turn section 63.

However, in the turbine moving blade 50 as described above, although various contrivances are made to ensure heat resistance performance, in the case cooling is still not adequate, there was the problem of burning and chipping at various locations of the turbine moving blade 50 such as in the blade tips and the blade surfaces. For example, since the temperature of the cooling medium supplied from the supply openings 51a, 52a and 53a of the base end surface of the urbine moving blade 50 rises as it passes through the internal flow paths 51, 52 and 53 and approaches the blade tip, there was the problem of cooling effects decreasing at the blade tip. As a result, not only is the lifetime of the turbine moving blade 50 shortened and the operating efficiency of a gas turbine using this turbine blade 50 decreased, but there was also the problem of a decrease in thermal efficiency.

SUMMARY OF THE INVENTION

In consideration of these circumstances, the object of the present invention is to provide a turbine moving blade that has high heat resistance and can be used for a long time, improve the thermal efficiency of gas turbines and improve their operating efficiency by improving the cooling efficiency of the turbine moving blade.

In order to achieve the object, the present invention provide a turbine moving blade arranged in a combustion gas flow path in which a plurality of blow-out openings for blowing out a cooling medium are formed in its outer surface, wherein among a plurality of cooling medium trailing edge blow-out openings arranged from the vicinity of a blade base to the vicinity of a blade tip along a blade trailing edge, the opening area of the blade tip trailing edge blow-out opening located in the vicinity of the blade tip is set to be larger than the opening area of the other trailing edge blow-out openings.

According to the turbine moving blade, among the cooling medium trailing edge blow-out openings provided in a row at a plurality of locations from the vicinity of the blade base to the vicinity of the blade tip along the blade trailing edge of the turbine moving blade, since the opening area of the blade tip trailing edge blow-out opening (tip flag feature) located in the vicinity of the blade tip is set to be larger than the opening area of the other trailing edge blow-out openings, the flow volume of cooling medium blown out from the blade tip trailing edge blow-out opening is increased greater than the other trailing edge blow-out openings, thereby improving cooling effects at the blade tip. In other words, since the decrease in cooling effects caused by the temperature rise of the cooling medium at the blade tip of the turbine moving blade is negated by the improvement in cooling effects resulting from increasing the cooling medium flow volume at the blade tip, cooling effects are improved. As a result, the heat resistance of the turbine moving blade can be improved, the occurrence of burning and chipping can be prevented, and the lifetime of the turbine moving blade can be extended.

In addition, in order to achieve the object, the present invention provide another turbine moving blade arranged in a combustion gas flow path in which a plurality of blow-out openings for blowing out a cooling medium are formed in its outer surface, wherein an internal flow path is provided through which the cooling medium flows therein, the internal flow path has at least one U-turn section, and turbulators inclined relative to the direction of flow of the cooling medium, and the inclined direction of the turbulators on the upstream side of the U-turn section is upstream to downstream when facing from a wall that is continuous with the outside wall of the U-turn section towards a wall that is continuous with the inside wall.

According to the turbine moving blade, cooling medium that flows through the internal flow path having a U-turn section and the turbulators are turned in the opposite direction by the U-turn section while being agitated by turbulators provided at an inclination. At this time, since the turbulators are provided on the upstream side of the U-turn section so as to be inclined upstream to downstream when facing from a wall continuous with the outside wall of the U-turn section towards a wall continuous with the inside wall, pressure loss is reduced in the U-turn section. In other words, although the flow of cooling medium on the inside wall of the U-turn section is normally difficult due to centrifugal force resulting from the cooling medium being turned in the opposite direction, since turbulators are provided on the upstream side of the U-turn section so as to force the cooling medium towards the inside of the U-turn section, the cooling medium flows easily through the U-turn section thereby decreasing pressure loss. As a result, the flow volume of cooling medium that flows through the internal flow path can be increased, thereby allowing cooling efficiency to be improved.

In addition, in order to achieve the object, the present invention provides another turbine moving blade arranged in a combustion gas flow path in which a plurality of blow-out openings for blowing out a cooling medium are formed in its outer surface, wherein tip holes are provided that discharge the cooling medium to a blade surface in the vicinity of a blade tip, and the tip holes are inclined towards the direction of the blade tip and have a fan-shaped opening that expands towards the direction of the blade tip.

According to the turbine moving blade, a film cooling effect is obtained in the vicinity of the blade tip as a result of discharging cooling medium from tip holes opened in the blade surface in the vicinity of the blade tip, and since these tip holes are inclined towards the direction of the blade tip and have a fan-shaped opening that expands towards the direction of the blade tip, cooling medium flows easier to the wing tip than in the prior art, and the effect of film cooling is improved at the blade tip. As a result, satisfactory cooling effects are obtained at the blade tip, thereby making it possible to prevent burning and chipping at the blade tip.

Furthermore, in order to achieve the object, the present invention provides a gas turbine comprising a compressor that compresses air, a combustion chamber that generates a high-temperature, high-pressure fluid, and a turbine that generates axial torque by converting the energy of the fluid to mechanical work with blades, wherein the gas turbine comprises the turbine moving blade.

According to the gas turbine, since it comprises the above-mentioned turbine moving blade, burning and chipping of the turbine moving blade is inhibited even if the temperature of the combustion gas (fluid) for operation at the turbine inlet reaches a high temperature. As a result, since the temperature of the combustion gas for operation at the turbine inlet can be raised to a high temperature, together with it being possible to improve the thermal efficiency of the gas turbine, since maintenance of the turbine moving blade can also be reduced, the operating efficiency of the gas turbine can be improved.

DETAILED DESCRIPTION OF THE PREFERRED EMBODIMENTS

The following provides an explanation of a mode for carrying out the present invention with reference to the drawings.

Figure 1:
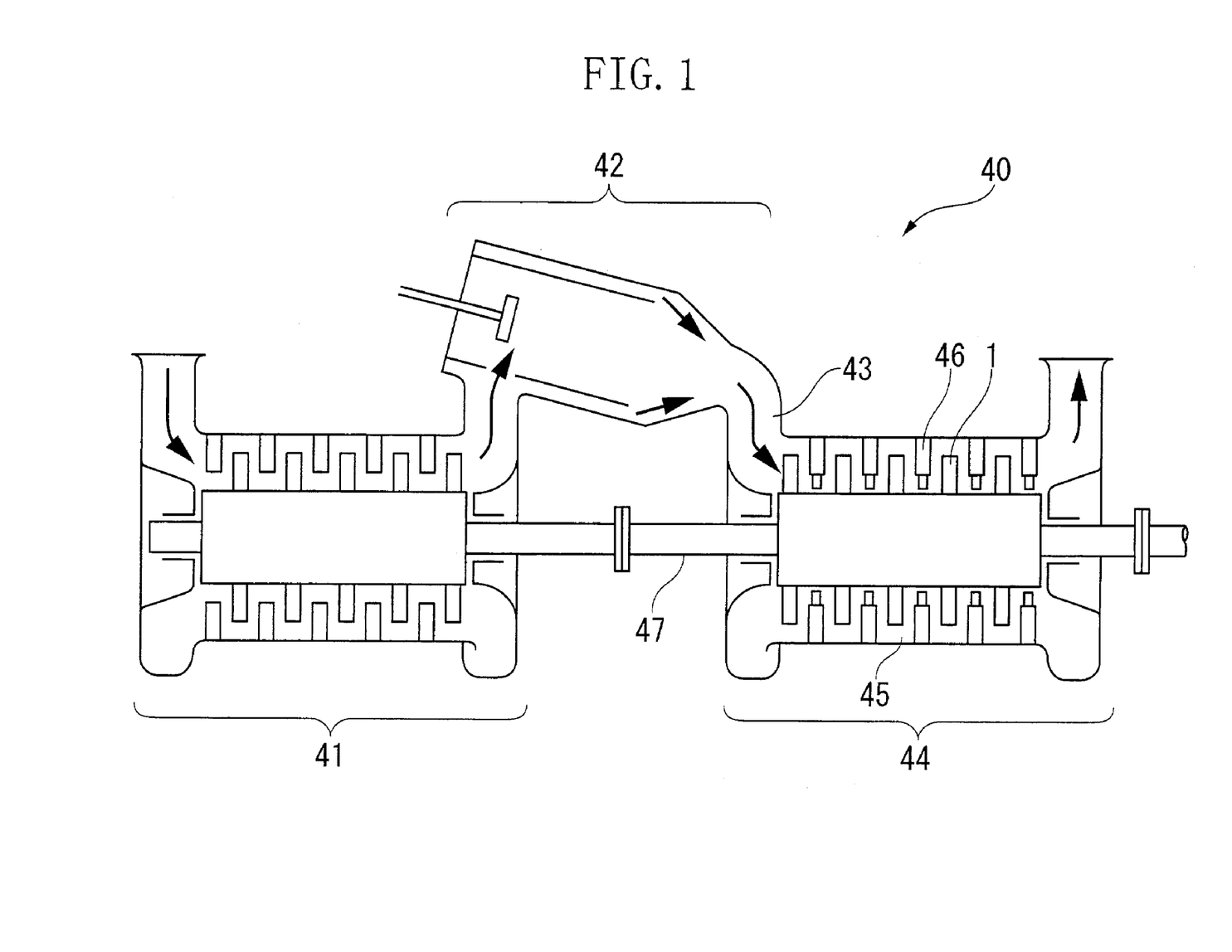
FIG. 1 is a schematic block drawing of a gas turbine in an embodiment of the present invention.

FIG. 1 is a cross-sectional view showing the general composition of gas turbine 40 of this embodiment. Air compressed with a compressor 41 is combusted after mixing with fuel in a combustion chamber 42, and this combustion gas (fluid) is then sent inside of a turbine 44 from a turbine inlet 43. In a combustion gas flow path 45 inside turbine 44, the combustion gas is rectified by turbine stationary blades 46, and the energy of the combustion gas generates axial torque by turbine moving blade 1 arranged on a rotating shaft 47.

Figure 2:
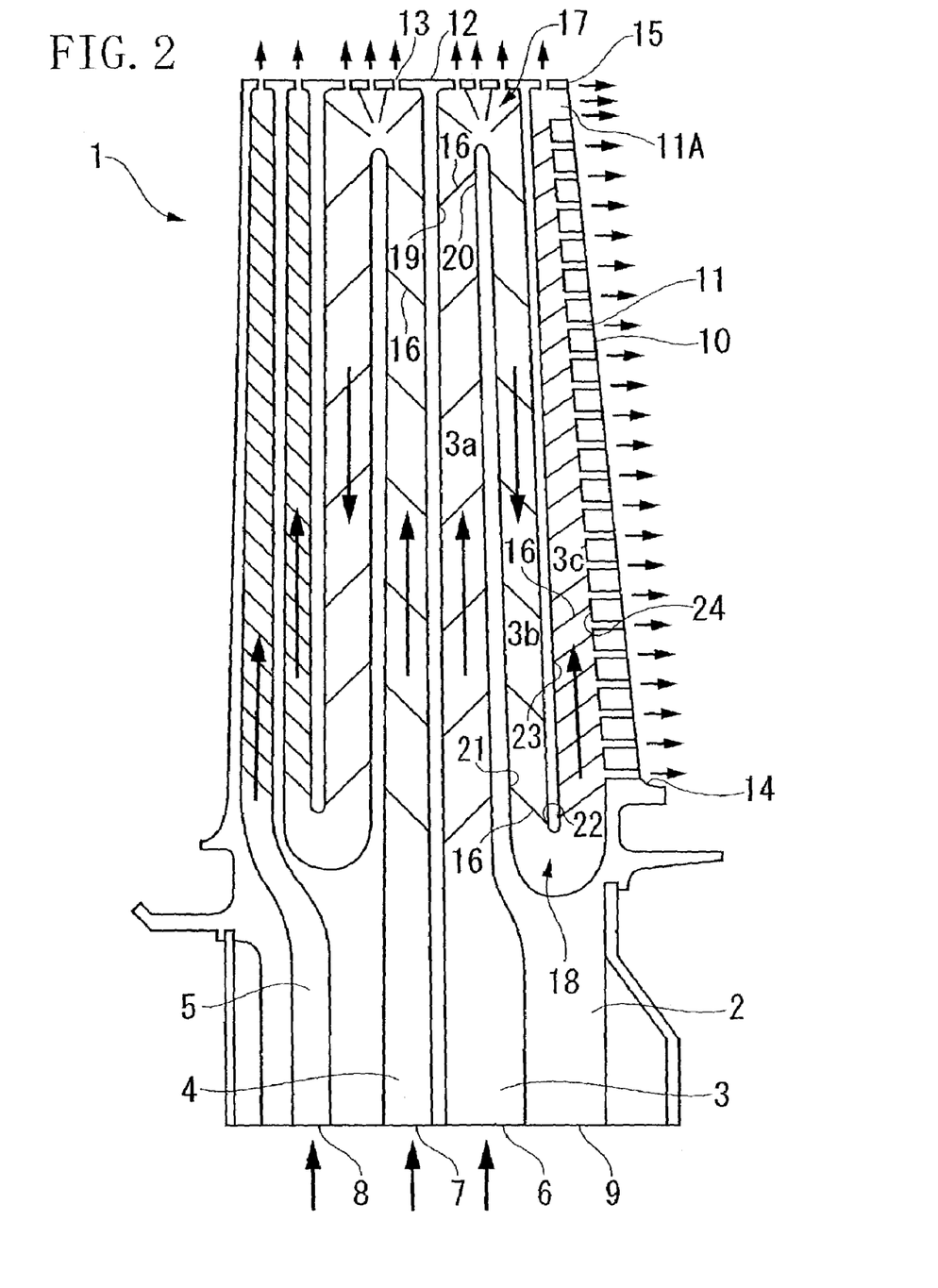
FIG. 2 is an internal cross-sectional view of a turbine moving blade in an embodiment of the present invention.

An internal cross-sectional view of the turbine moving blade 1 used in the gas turbine 40 is shown in FIG. 2. The base 2 of the turbine moving blade 1 is fixed to the rotating shaft 47, internal flow paths 3, 4 and 5 are provided therein, and supply openings 6, 7, and 8 that supply cooling medium are provided in a base surface 9. In addition, a plurality of blow-out openings for blowing out cooling medium onto the outer surface are provided in the turbine moving blade 1. In FIG. 2, a plurality of trailing edge blow-out openings 11 opened in the trailing edge 10, and a plurality of tip surface blow-out openings 13 opened in the blade tip surface 12, are shown. The trailing edge blow-out openings 11 are provided at a plurality of locations arranged from the vicinity of the base 14 to the vicinity of the blade tip 15 along the trailing edge 10 of the turbine moving blade 1. Among the plurality of the trailing edge blow-out openings 11, a blade tip trailing edge blow-out opening 11A located near the blade tip is set to have a larger opening area than the other trailing edge blow-out openings 11. Moreover, the orientation of the arrows shown in FIG. 2 indicates the orientation of the flow of cooling medium.

A plurality of turbulators 16 are provided in the internal flow paths 3, 4 and 5 at an inclination relative to the flow of cooling medium. In the case of the internal flow path 3 having two U-turn sections 17 and 18, the turbulators are provided as follows. That is, in the flow path 3a on the upstream side of the first U-turn section 17, the turbulators are provided so as to be inclined upstream to downstream when facing a wall that is continuous with the outside wall 19 of the U-turn section 17 towards a wall that is continuous with the inside wall 20 of the U-turn section 17. In other words, since the cooling medium is turned in the direction to the right in the U-turn section 17, the turbulators 16 in the flow path 3a are inclined such that their left side becomes the upstream side, and their right side becomes the downstream side.

In addition, since the flow path 3b on the downstream side of the U-turn section 17 becomes the upstream side relative to the next U-turn section 18, in flow path 3b, the turbulators 16 are provided so as to be inclined upstream to downstream when facing from a wall that is continuous with the outside wall 21 of the U-turn section 18 towards a wall that is continuous with the inside wall 22 of the U-turn section 18. In other words, the turbulators 16 are provided so that their inclination is opposite that of the upstream and downstream sides of the U-turn section 17. In addition, the turbulators 16 in the flow path 3c on the downstream side of the U-turn section 18 are provided so that they are inclined upstream to downstream when facing from a wall 23 serving as the leading edge side towards a wall 24 serving as the trailing edge side. In addition, the flow path 4 also has U-turn sections, and the turbulators 16 are provided at a similar inclination to the inclination of the turbulators 16 of the flow path 3.

Figure 3:
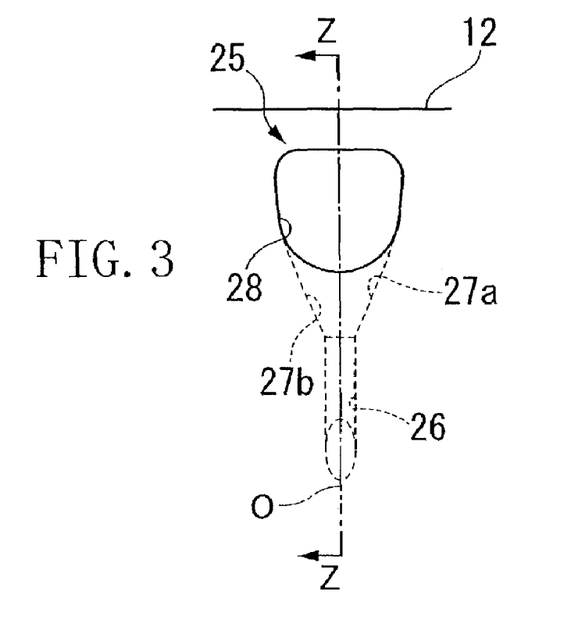
FIG. 3 is a front view of a tip hole provided in the turbine moving blade.
Figure 4:
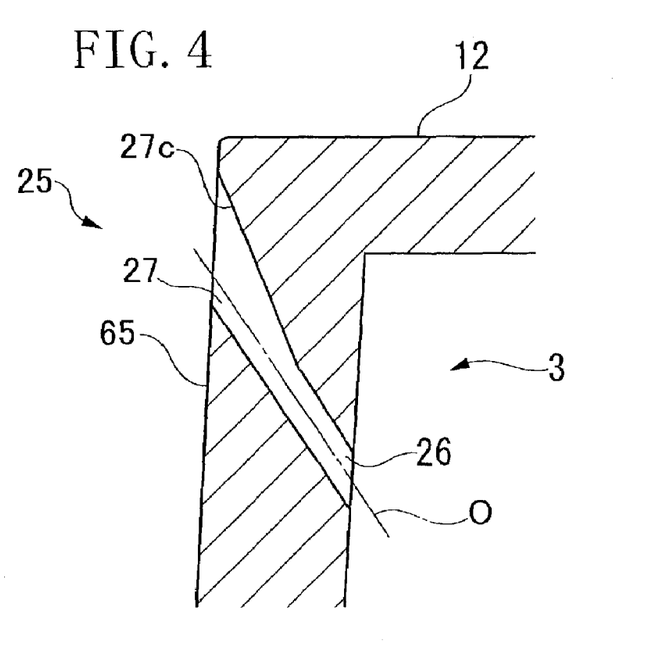
FIG. 4 is a cross-sectional view taken along line Z—Z of FIG. 2.

In addition, a front view of a tip hole 25 provided in the blade surface in the vicinity of the blade tip surface 12 of the turbine moving blade 1 is shown in FIG. 3, while its cross-sectional view is shown in FIG. 4. The tip hole 25 comprises a round hole 26 inclined from the base side towards the blade tip surface 12 of the turbine moving blade 1 when facing from the internal flow path 3 (and similarly in the flow paths 4 and 5) towards a high-pressure side blade surface 65 (see FIG. 8), and a fan-shaped opening 27 that is continuous with the round hole 26 and expands towards the direction of the blade tip. The opening 27 is formed so that a right side surface 27a and a left side surface 27b, when viewing from the front, and a top side surface 27c, when viewing cross-sectionally, each move away from a central axis 0 of the round hole 26 moving from the internal flow path 3 towards the high-pressure side blade surface 65, and the shape of edge 28 of the opening 27 formed in the high-pressure side blade surface 65 is the shape of a fan when viewed from the front.

In this turbine moving blade 1, cooling medium supplied from a supply opening 6 to the internal flow path 3 flows through the flow path 3a while being agitated by the turbulators 16, changes its direction of flow at the U-turn sections 17 and 18, a portion is blown out from the trailing edge blow-out openings 11 while passing through the flow path 3c, and is also blown out from the blade tip trailing edge blow-out opening 11A provided at the end of the flow path 3c. Accompanying this, cooling medium is also blown out onto the outer surface of the turbine moving blade 1 from the tip surface blow-out openings 13, and the tip holes 25.

At this time, since the blade tip trailing edge blow-out opening 11A is set to have a larger opening area than the other trailing edge blow-out openings 11, the flow volume of cooling medium through the blade tip trailing edge blow-out opening 11A is greater than the flow volume through the other trailing edge blow-out openings, and cooling effects are improved in the vicinity of blade tip 15. In addition, since the flow volume itself through the internal flow path 3 can be increased by increasing the opening area of the blade tip trailing edge blow-out opening 11A, the cooling effects of the internal flow path 3 are improved. As a result, the heat resistance of the turbine moving blade 1 can be improved, the occurrence of burning and chipping can be prevented, and the lifetime of the turbine moving blade 1 can be extended.

In addition, since a plurality of the turbulators 16 are provided so as to be inclined upstream to downstream when facing from a wall that is continuous with the outside wall 19 towards a wall that is continuous with the inside wall 20 in the flow path 3a on the upstream side of U-turn section 17, pressure loss in the U-turn section 17 decreases. In other words, pressure loss is thought to decreases as a result of the turbulators 16 being provided so as to force the cooling medium to the inside of the U-turn section 17 upstream from U-turn section 17. This allows the obtaining of similar effects in both the U-turn section 18 and the U-turn sections of the flow path 4.

Figure 5:
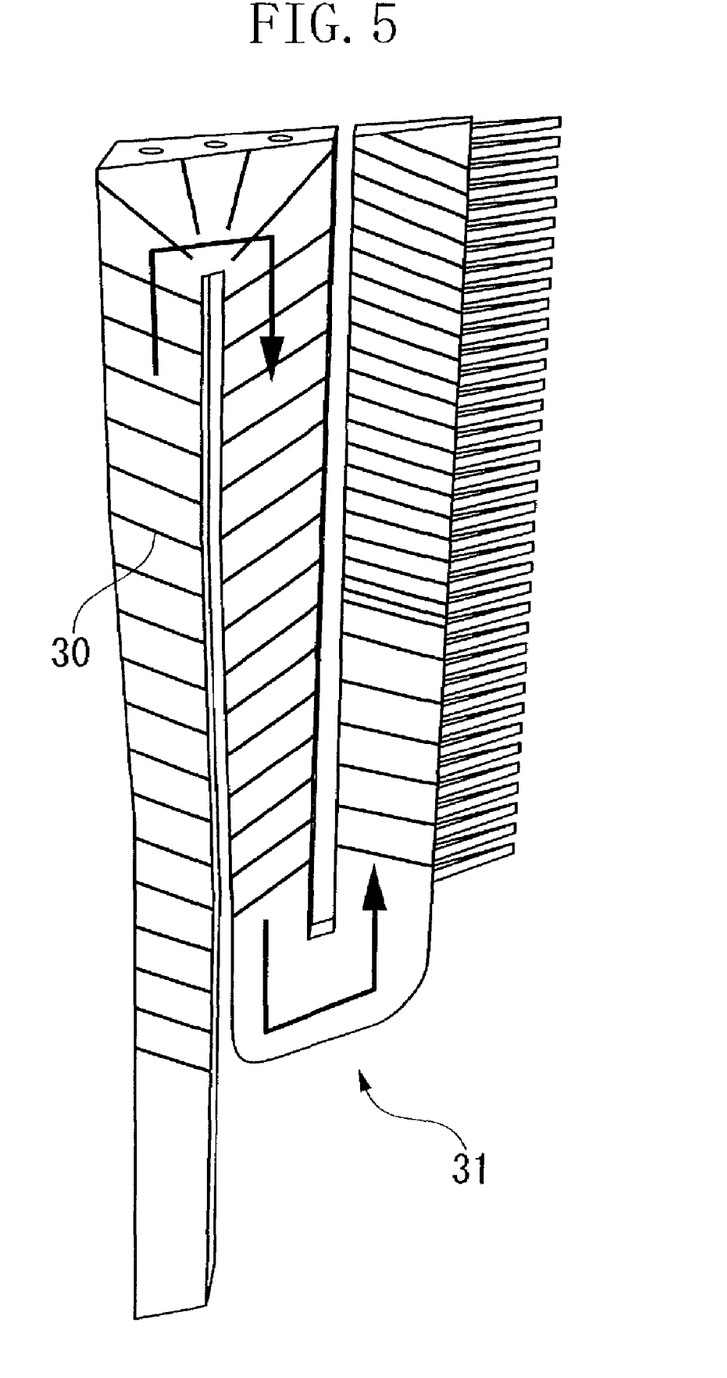
FIG. 5 is a schematic drawing of an internal flow path through inclined turbulators of the prior art used in CFD analysis.
Figure 6:
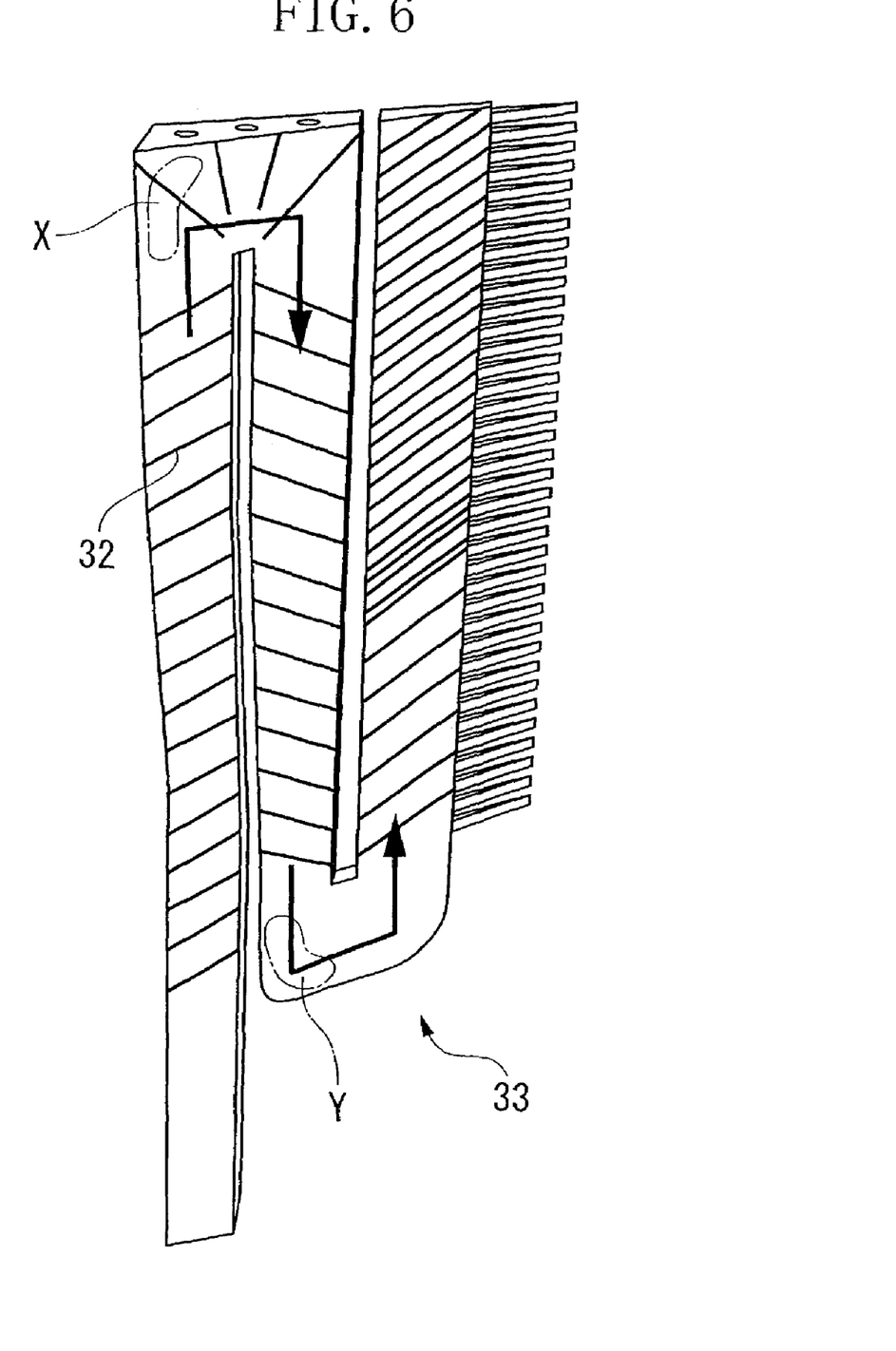
FIG. 6 is a schematic drawing of an internal flow path through inclined turbulators of the present invention used in CFD analysis.

FIGS. 5 and 6 show schematic drawings used for computational fluid dynamics (CFD) analysis in flow path 31, in which turbulators 30 are provided at an inclination of the prior art, and flow path 33, in which turbulators 32 are provided at the inclination of the present form for carrying out the invention. CFD analysis is a technique for quantitatively evaluating pressure loss generated in a flow path based on the distribution of the amounts of entropy generated. According to this CFD analysis, an approximately 15% reduction in the pressure loss coefficient was confirmed in region X and region Y in FIG. 6.

In addition, since the tip holes 25 are inclined towards the blade tip surface 12 and have the fan-shaped opening 27, the flow volume of cooling medium discharged towards the blade tip surface 12 is increased and the effect of film cooling in the vicinity of the blade tip surface 12 is improved. As a result, satisfactory cooling effects are obtained in the vicinity of the blade tip surface 12, and burning and chipping in the vicinity of the blade tip surface 12 can be prevented.

In addition, since heat resistance of the turbine moving blade 1 is improved due to the above effects, the temperature of combustion gas (fluid) for operation at turbine inlet 43 can be raised to a higher temperature than in the prior art, thereby enabling the thermal efficiency of the gas turbine 40 used by arranging the turbine moving blades 1 in the combustion gas flow path 45 to be improved. In addition, since burning and chipping of the turbine moving blades 1 are prevented, and the turbine moving blades 1 can be used for a long period of time, the operation and stopping of gas turbine 40 due to performing maintenance on the turbine moving blades 1 can be reduced, thereby making it possible to improve the operating efficiency of the gas turbine 40.

Furthermore, although two U-turn sections 17 and 18 are provided in the flow path 3 in the embodiment, U-turn sections may be provided at one location or two or more locations. In addition, although the trailing edge blow-out openings 11 are provided on the trailing edge 10 of the turbine moving blade 1, the present invention may also be used for a turbine moving blade in which pin fins are provided. In addition, the flow paths are not limited to three flow paths, but rather the number of flow paths may be less than or more than three.

What is claimed is:
1. A turbine moving blade arranged in a combustion gas flow path in which a plurality of blow-out openings for blowing out a cooling medium are formed in its outer surface, wherein among a plurality of cooling medium trailing edge blow-out openings arranged from the vicinity of a blade base to the vicinity of a blade tip along a blade trailing edge, the opening area of the blade tip trailing edge blow-out opening located in the vicinity of the blade tip is set to be larger than the opening area of all of the remaining trailing edge blow-out openings; and wherein turbulators are provided in the combustion gas flow path, in which the cooling medium turning back at the blade base trailing edge of the moving blade and flowing toward the blade tip flows, such that the inclined direction of the turbulators is upstream to downstream from a leading-edge-side wall towards a trailing-edge-side wall in the flow direction of the cooling medium.

2. A turbine moving blade according to claim 1, wherein tip holes are provided that discharge said cooling medium to a blade surface in the vicinity of a blade tip; and wherein said tip holes are inclined towards the direction of the blade tip and have a fan-shaped opening that expands towards the direction of the blade tip.

3. A gas turbine comprising a compressor that compresses air, a combustion chamber that generates a high-temperature, high-pressure fluid, and a turbine that generates axial torque by converting the energy of said fluid to mechanical work with blades, wherein said gas turbine comprises a turbine moving blade according to claim 1.

4. A gas turbine comprising a compressor that compresses air, a combustion chamber that generates a high-temperature, high-pressure fluid, and a turbine that generates axial torque by converting the energy of said fluid to mechanical work with blades, wherein said gas turbine comprises a turbine moving blade according to claim 2.

5. A turbine moving blade arranged in a combustion gas flow path in which a plurality of blow-out openings for blowing out a cooling medium are formed in its outer surface, wherein an internal flow path is provided through which said cooling medium flows therein, and said internal flow path has at least one U-turn section at one location;

wherein turbulators are provided in said internal flow path, which are inclined relative to the direction of flow of said cooling medium, and wherein said turbulators on the upstream side of said U-turn section are inclined so that a first portion of said turbulators that abuts an outside wall of said U-turn section are upstream of a second portion of said turbulators that abuts an inside wall of said U-turn section.

6. A turbine moving blade according to claim 5, wherein tip holes are provided that discharge said cooling medium to a blade surface in the vicinity of a blade tip; and wherein said tip holes are inclined towards the direction of the blade tip and have a fan-shaped opening that expands towards the direction of the blade tip.

7. A gas turbine comprising a compressor that compresses air, a combustion chamber that generates a high-temperature, high-pressure fluid, and a turbine that generates axial torque by converting the energy of said fluid to mechanical work with blades, wherein said gas turbine comprises a turbine moving blade according to claim 6.

8. A gas turbine comprising a compressor that compresses air, a combustion chamber that generates a high-temperature, high-pressure fluid, and a turbine that generates axial torque by converting the energy of said fluid to mechanical work with blades, wherein said gas turbine comprises a turbine moving blade according to claim 5.

* * * * *